US012738264B2

(12) United States Patent
Huang et al.

(10) Patent No.: US 12,738,264 B2
(45) Date of Patent: Sep. 15, 2026

(54) SEMANTIC SEGMENTATION WITH LANGUAGE MODELS FOR LONG-FORM AUTOMATIC SPEECH RECOGNITION

(71) Applicant: Google LLC, Mountain View, CA (US)

(72) Inventors: Wenqian Huang, Mountain View, CA (US); Hao Zhang, Jericho, NY (US); Shankar Kumar, New York, NY (US); Shuo-yiin Chang, Sunnyvale, CA (US); Tara N. Sainath, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 275 days.

(21) Appl. No.: 18/585,020

(22) Filed: Feb. 22, 2024

(65) Prior Publication Data

US 2024/0290320 A1 Aug. 29, 2024

Related U.S. Application Data

(60) Provisional application No. 63/487,600, filed on Feb. 28, 2023.

(51) Int. Cl.
*G10L 15/16* (2006.01)
*G06F 40/30* (2020.01)
(Continued)

(52) U.S. Cl.
CPC ............ *G10L 15/063* (2013.01); *G06F 40/30* (2020.01); *G10L 15/26* (2013.01)

(58) Field of Classification Search
CPC ................................ G10L 15/22; G10L 15/16
See application file for complete search history.

(56) References Cited

U.S. PATENT DOCUMENTS

2020/0335091 A1* 10/2020 Chang ..................... G10L 15/14
2020/0349922 A1* 11/2020 Peyser .................... G10L 13/00
(Continued)

OTHER PUBLICATIONS

Zhou, Zhikai, Tian Tan, and Yanmin Qian. "Punctuation prediction for streaming on-device speech recognition." ICASSP 2022—2022 IEEE International Conference on Acoustics, Speech and Signal Processing (ICASSP). IEEE, 2022. (Year: 2022).*
(Continued)

*Primary Examiner* — Jialong He
(74) *Attorney, Agent, or Firm* — Honigman LLP; Brett A. Krueger; Grant Griffith

(57) ABSTRACT

A joint segmenting and ASR model includes an encoder to receive a sequence of acoustic frames and generate, at each of a plurality of output steps, a higher order feature representation for a corresponding acoustic frame. The model also includes a decoder to generate based on the higher order feature representation at each of the plurality of output steps a probability distribution over possible speech recognition hypotheses, and an indication of whether the corresponding output step corresponds to an end of segment (EOS). The model is trained on a set of training samples, each training sample including audio data characterizing multiple segments of long-form speech; and a corresponding transcription of the long-form speech, the corresponding transcription annotated with ground-truth EOS labels obtained via distillation from a language model teacher that receives the corresponding transcription as input and injects the ground-truth EOS labels into the corresponding transcription between semantically complete segments.

18 Claims, 7 Drawing Sheets

(51) Int. Cl.
*G10L 15/06* (2013.01)
*G10L 15/22* (2006.01)
*G10L 15/26* (2006.01)

(56) References Cited

U.S. PATENT DOCUMENTS

| | | | |
|---|---|---|---|
| 2021/0350794 A1 | 11/2021 | Sainath et al. | |
| 2022/0238101 A1 | 7/2022 | Sainath et al. | |
| 2022/0310062 A1 | 9/2022 | Sainath et al. | |
| 2022/0310071 A1 | 9/2022 | Botros et al. | |
| 2023/0343332 A1* | 10/2023 | Huang | H04N 19/117 |
| 2024/0169981 A1* | 5/2024 | Huang | G10L 15/16 |

OTHER PUBLICATIONS

Huang, W. Ronny, et al. "E2e segmenter: Joint segmenting and decoding for long-form asr." arXiv preprint arXiv:2204.10749 (Apr. 2022). (Year: 2022).*

Jain, "RNN-T Based ASR Systems", [online] www.sites.cc.gatech.edu, published in 2021. (Year: 2021).*

Behre, Piyush, et al. "Streaming punctuation: A novel punctuation technique leveraging bidirectional context for continuous speech recognition." arXiv preprint arXiv:2301.03819 (2022). (Year: 2022).*

Ronny Huang W et al, "E2E Segmenter: Joint Segmenting and Decoding for Long-Form AST", arxiv.org, Cornell University Library, 201 OLIN Library Cornell University Ithaca, NY 14853, Jun. 15, 2022 (Jun. 15, 2022), XP091246889.

Ronny Huang W et al, "E2E Segmentation in a Two-Pass Cascaded Encoder ASR Model", arxiv.org, Cornell University Library, 201 OLIN Library Cornell University Ithaca, NY 14853,Nov. 28, 2022 (Nov. 28, 2022), XP091380649.

Li Bo et al, "Towards Fast and Accurate Streaming End-To-End ASR", ICASSP 2020—2020 IEEE International Conference on Acoustics, Speech and Signal Processing (ICASSP), IEEE,May 4, 2020 (May 4, 2020), p. 6069-6073, XP033794369, DOI: 10.1109/ICASSP40776.2020.9054715.

Chang Shuo-Yiin et al, "Joint Endpointing and Decoding with End-to-end Models", ICASSP 2019—2019 IEEE International Conference on Acoustics, Speech and Signal Processing (ICASSP), IEEE, May 12, 2019 (May 12, 2019), p. 5626-5630, XP033565662, DOI: 10.1109/ICASSP.2019.8683109.

Bo Li et al, "A Language Agnostic Multilingual Streaming On-Device ASR System", arxiv.org, Cornell University Library, 201 OLIN Library Cornell University Ithaca, NY 14853,Aug. 29, 2022 (Aug. 29, 2022), XP091305038.

Ronny Huang W et al, "Semantic Segmentation with Bidirectional Language Models Improves Long-form ASR", arxiv.org, Cornell University Library, 201 OLIN Library Cornell University Ithaca, NY 14853,May 28, 2023 (May 28, 2023), XP091523059.

International Search Report and Written Opinion issued in related PCT Application No. PCT/US2024/016965, dated May 2, 2024.

* cited by examiner

SEMANTIC SEGMENTATION WITH LANGUAGE MODELS FOR LONG-FORM AUTOMATIC SPEECH RECOGNITION

CROSS REFERENCE TO RELATED APPLICATIONS

This U.S. Patent application claims priority under 35 U.S.C. § 119(e) to U.S. Provisional Patent Application No. 63/487,600, filed on Feb. 28, 2023. The disclosure of this prior application is considered part of the disclosure of this application and is hereby incorporated by reference in its entirety.

TECHNICAL FIELD

This disclosure relates to semantic segmentation with language models for long-form automated speech recognition (ASR).

BACKGROUND

Automatic speech recognition (ASR) is the process of transcribing input audio into text. ASR is an increasingly important technology that may be used to enable a user to interact with mobile or other devices using spoken (i.e., speech-based) interactions.

SUMMARY

One aspect of the disclosure provides a joint segmenting and automated speech recognition (ASR) model that includes an encoder and a decoder. The encoder is configured to receive, as input, a sequence of acoustic frames characterizing one or more spoken utterances, and generate, at each output step of a plurality of output steps, a higher order feature representation for a corresponding acoustic frame in the sequence of acoustic frames. The decoder is configured to receive, as input, the higher order feature representation generated by the encoder at each output step of the plurality of output steps. The decoder is configured to generate, at each output step of the plurality of output steps, a probability distribution over possible speech recognition hypotheses, and an indication of whether the output step corresponds to an end of segment. The joint segmenting and ASR model is trained on a set of training samples, each training sample in the set of training samples including audio data characterizing multiple segments of long-form speech, and a corresponding transcription of the long-form speech. The corresponding transcription is annotated with ground-truth end of segment labels obtained via distillation from a language model teacher that receives the corresponding transcription as input and injects the ground-truth end of segment labels into the corresponding transcription between semantically complete segments.

Implementations of the disclosure may include one or more of the following optional features. In some implementations, the language model teacher is trained on a corpus of written text containing punctuation to teach the language model teacher to learn how to semantically predict ground-truth end of segment labels based on positions of punctuation in the written text. In some examples, the language model teacher includes a bi-directional recurrent neural network architecture.

In some examples, the decoder includes a prediction network configured to, at each output step of the plurality of output steps, receive, as input, a sequence of non-blank symbols output by a final Softmax layer, and generate a hidden representation In these examples, the decoder also includes a first joint network configured to: receive, as input, the hidden representation generated by the prediction network at each output step of the plurality of output steps and the higher order feature representation generated by the encoder at each output step of the plurality of output steps; and generate, at each output step of the plurality of output steps, the probability distribution over possible speech recognition hypotheses. The decoder further includes a second joint network configured to: receive, as input, the hidden representation generated by the prediction network at each output step of the plurality of output steps and the higher order feature representation generated by the encoder at each output step of the plurality of output steps; and generate, at each of output step the plurality of output steps, the indication of whether the output step corresponds to an end of segment.

In some implementations, at each output step of the plurality of output steps: the sequence of previous non-blank symbols received as input at the prediction network includes a sequence of N previous non-blank symbols output by the final Softmax layer; and the prediction network is configured to generate the hidden representation by: for each non-blank symbol of the sequence of N previous non-blank symbols, generating a respective embedding; and generating an average embedding by averaging the respective embeddings, the average embedding including the hidden representation. In some examples, the prediction network includes a V2 embedding look-up table. In some implementations, a training process trains the joint segmenting and ASR model on the set of training samples by: initially training the first joint network to learn how to predict the corresponding transcription of the spoken utterance characterized by the audio data of each training sample; and after training the first joint network, initializing the second joint network with the same parameters as the trained first joint network and using the ground-truth end of segment label inserted into the corresponding transcription of the spoken utterance characterized by the audio data of each training sample.

In some examples, the encoder includes a causal encoder including a stack of conformer layers or transformer layers. In some implementations, the ground-truth end of segment labels are inserted into the corresponding transcription automatically without any human annotation. In some examples, the joint segmenting and ASR model is trained to maximize a probability of emitting the ground-truth end of segment label.

Another aspect of the disclosure provides a computer-implemented method executed on data processing hardware that causes the data processing hardware to implement a joint segmenting and automated speech recognition (ASR) model, the joint segmenting and ASR model including an encoder and a decoder. The encoder is configured to receive, as input, a sequence of acoustic frames characterizing one or more spoken utterances, and generate, at each output step of a plurality of output steps, a higher order feature representation for a corresponding acoustic frame in the sequence of acoustic frames. The decoder is configured to receive, as input, the higher order feature representation generated by the encoder at each output step of the plurality of output steps. The decoder is configured to generate, at each output step of the plurality of output steps a probability distribution over possible speech recognition hypotheses, and an indication of whether the output step corresponds to an end of segment. The joint segmenting and ASR model is trained on a set of training samples, each training sample in the set of training samples including audio data characterizing multiple segments of long-form speech, and a corresponding transcription of the long-form speech. The corresponding transcription is annotated with ground-truth end of segment labels obtained via distillation from a language model teacher that receives the corresponding transcription as input and injects the ground-truth end of segment labels into the corresponding transcription between semantically complete segments.

Implementations of the disclosure may include one or more of the following optional features. In some implementations, the language model teacher is trained on a corpus of written text containing punctuation to teach the language model teacher to learn how to semantically predict ground-truth end of segment labels based on positions of punctuation in the written text. In some examples, the language model teacher includes a bi-directional recurrent neural network architecture.

In some examples, the decoder includes a prediction network configured to, at each output step of the plurality of output steps, receive, as input, a sequence of non-blank symbols output by a final Softmax layer, and generate a hidden representation In these examples, the decoder also includes a first joint network configured to: receive, as input, the hidden representation generated by the prediction network at each output step of the plurality of output steps and the higher order feature representation generated by the encoder at each output step of the plurality of output steps; and generate, at each output step of the plurality of output steps, the probability distribution over possible speech recognition hypotheses. The decoder further includes a second joint network configured to: receive, as input, the hidden representation generated by the prediction network at each output step of the plurality of output steps and the higher order feature representation generated by the encoder at each output step of the plurality of output steps; and generate, at each of output step the plurality of output steps, the indication of whether the output step corresponds to an end of segment.

In some implementations, at each output step of the plurality of output steps: the sequence of previous non-blank symbols received as input at the prediction network includes a sequence of N previous non-blank symbols output by the final Softmax layer; and the prediction network is configured to generate the hidden representation by: for each non-blank symbol of the sequence of N previous non-blank symbols, generating a respective embedding; and generating an average embedding by averaging the respective embeddings, the average embedding including the hidden representation. In some examples, the prediction network includes a V2 embedding look-up table. In some implementations, a training process trains the joint segmenting and ASR model on the set of training samples by: initially training the first joint network to learn how to predict the corresponding transcription of the spoken utterance characterized by the audio data of each training sample; and after training the first joint network, initializing the second joint network with the same parameters as the trained first joint network and using the ground-truth end of segment label inserted into the corresponding transcription of the spoken utterance characterized by the audio data of each training sample.

In some examples, the encoder includes a causal encoder including a stack of conformer layers or transformer layers. In some implementations, the ground-truth end of segment labels are inserted into the corresponding transcription automatically without any human annotation. In some examples, the joint segmenting and ASR model is trained to maximize a probability of emitting the ground-truth end of segment label.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Automatic speech recognition (ASR) is the process of transcribing input audio into text. ASR is an increasingly important technology that may be used to enable a user to interact with mobile or other devices using spoken (i.e., speech-based) interactions. Recognizing long-form speech (e.g., minutes long) in short segments of a few or several seconds is a common practice for improving ASR accuracy and user-perceived latency. Model state may be wholly or partially discarded across segment boundaries, which may help to prevent a speech recognizer from entering strange states unseen during short-form training and make room for more diversity in beam search hypotheses. Conventional segment boundary classifiers rely on characteristics of input audio (e.g., periods of silence) to delineate segments of long-form speech. However, silence does not always accurately demarcate complete thoughts, as speakers may hesitate before finishing a sentence in real-world speech. Accordingly, there is a need for improved segmentation of long-form speech.

In disclosed implementations, an ASR model includes a semantic segment boundary classifier that is trained to predict semantic segment boundaries during speech recognition for long-form speech. The ASR model then uses the predicted semantic segment boundaries to segment the long-form speech into segments for speech recognition purposes. Here, semantic segmentation may refer to the use of punctuation to logically understand the meaning of long-form speech such that the long-form speech can be segmented into segments that contain complete thoughts for speech recognition purposes. Because ground-truth transcriptions used to train an ASR model rarely contain punctuation, the semantic segment boundary classifier is trained, using a bidirectional language model, to predict segment boundaries (e.g., complete thought boundaries) in long-form speech. Here, the bidirectional language model may be trained on a large corpus of written text to learn to predict the punctuation contained in the corpus of written text. The bidirectional language model is then used as a teacher model to predict semantic segment boundaries in ground-truth training transcriptions based on the predicted punctuation. End of segment (EOS) labels corresponding to segment boundaries predicted by the bidirectional language model are then inserted into the ground-truth training transcriptions. The ground-truth training transcriptions and corresponding training utterances are then used to train the semantic segment boundary classifier as a student model to predict the segment boundaries in the ground-truth training transcriptions.

Figure 1:
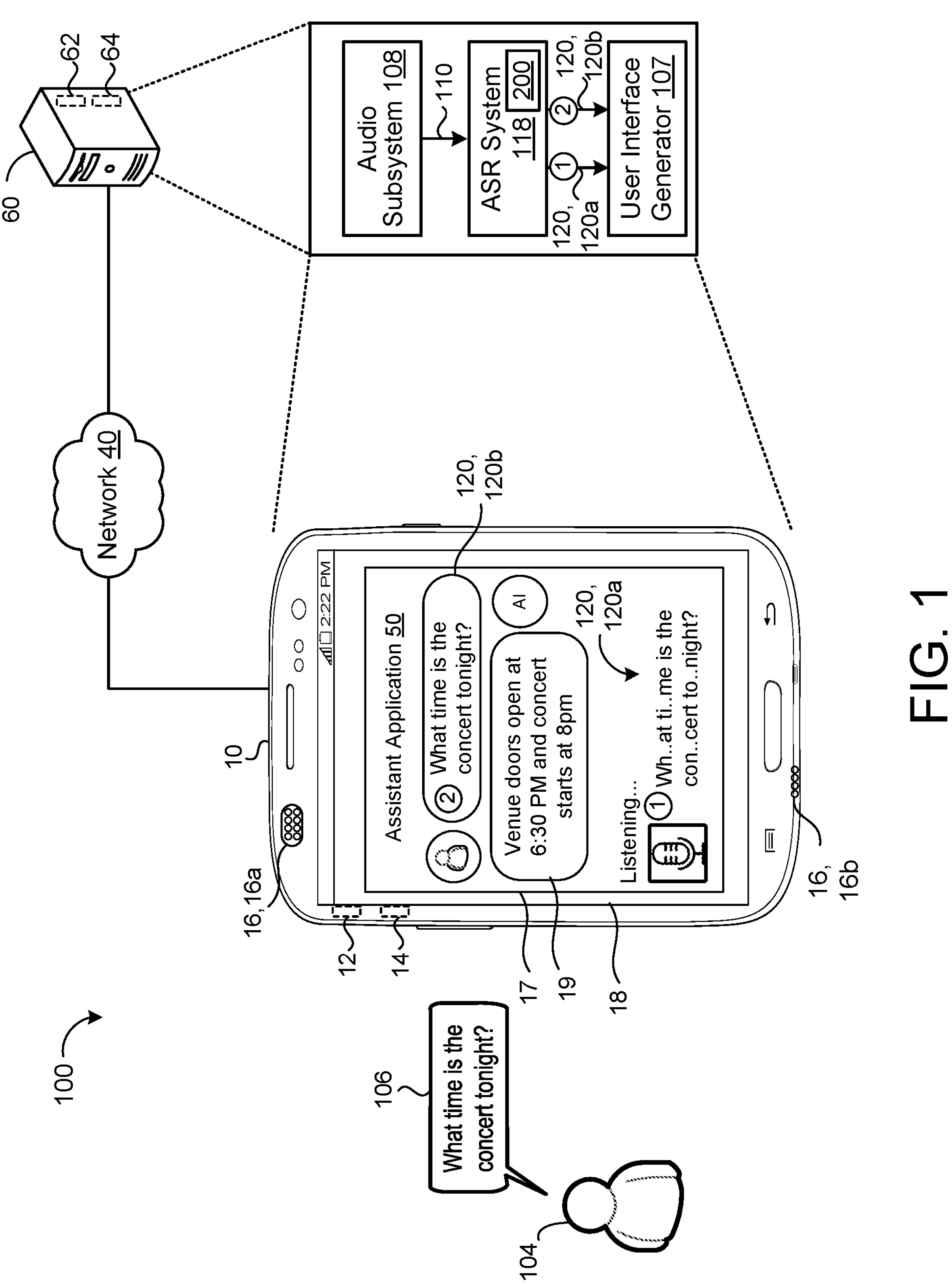
FIG. 1 is a schematic view of an example speech recognition system.

FIG. 1 is an example system 100 that includes one or more users 104 interacting with a user device 10 through voice input. The user device 10 (also referred to generally as a user device 10) is configured to capture sounds (e.g., streaming audio data 110) from the one or more users 104 within the system 100. Here, the streaming audio data 110 may refer to an utterance 106 spoken by the user 104 that functions as an audible query, a command for the user device 10, or an audible communication captured by the user device 10. Speech-enabled systems of the user device 10 may field the query or the command by answering the query and/or causing the command to be performed/fulfilled by one or more downstream applications.

The user device 10 may correspond to any computing device associated with the user 104 and capable of receiving audio data. Some examples of user devices 10 include, but are not limited to, mobile devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions that, when executed by the data processing hardware 12, cause the data processing hardware 12 to perform one or more operations. The user device 10 further includes an audio system 16 with an audio capture device 16*a* (e.g., a microphone) for capturing and converting the utterances 106 into electrical signals and a speech output device 16*b* (e.g., a speaker) for communicating with an audible audio signal (e.g., as output data from the user device 10). The user device 10 may implement an array of audio capture devices 16*a* without departing from the scope of the present disclosure, whereby one or more capture devices 16*a* in the array may not physically reside on the user device 10, but be in communication with the audio system 16.

The system 100 includes an automated speech recognition (ASR) system 118 that implements a joint segmenting and ASR model 200 (also referred to herein as ASR model 200) and resides on the user device 10 of the user 104 and/or on a remote computing system 60 (e.g., one or more remote servers of a distributed system executing in a cloud-computing environment) in communication with the user device 10 via a network 40. As described below in connection with FIG. 2, the ASR model includes a semantic segment boundary classifier 230 to semantically identify segments of long-form speech for ASR processing. The remote computing system 60 may include physical and/or virtual (e.g., cloud based) resources, such as data processing hardware 62 (e.g., remote servers or CPUs) and/or memory hardware 64 (e.g., remote databases or other storage hardware). The memory hardware 64 is in communication with the data processing hardware 62 and stores instructions that, when executed by the data processing hardware 62, cause the data processing hardware 62 to perform one or more operations.

The user device 10 and/or the remote computing system 60 also includes an audio subsystem 108 configured to receive the utterance 106 spoken by the user 104 and captured by the audio capture device 16*a*, and convert the utterance 106 into a corresponding digital format associated with input acoustic frames 110 capable of being processed by the ASR system 118. In the example shown, the user speaks a respective utterance 106 and the audio subsystem 108 converts the utterance 106 into a corresponding sequence of acoustic frames 110 for input to the ASR system 118. Thereafter, the ASR model 200 receives, as input, the sequence of acoustic frames 110 corresponding to the utterance 106, and generates/predicts, at each output step, a corresponding transcription 120 (e.g., speech recognition result/hypothesis) of the utterance 106 as the ASR model 200 receives (e.g., processes) each acoustic frame 110 in the sequence of acoustic frames 110.

In the example shown, the ASR model 200 may perform streaming speech recognition to produce an initial speech recognition result 120, 120*a* and generate a final speech recognition result 120, 120*b* by improving the initial speech recognition result 120*a*. The speech recognition results 120 may either correspond to a partial speech recognition result or an entire speech recognition result. Stated differently, the speech recognition result 120 may either correspond to a portion of an utterance 106 or an entire utterance 106. For example, the partial speech recognition result may correspond to a portion of a spoken utterance or even a portion of a spoken term. However, as will become apparent, the ASR model 200 may perform additional processing on the final speech recognition result 120*b* whereby the final speech recognition result 120*b* may be delayed from the initial speech recognition result 120*a*.

The user device 10 and/or the remote computing system 60 also executes a user interface generator 107 configured to present a representation of the transcription 120 of the utterance 106 to the user 104 of the user device 10. As described in greater detail below, the user interface generator 107 may display the initial speech recognition results 120*a* in a streaming fashion during time 1 and subsequently display the final speech recognition results 120*b* in a streaming fashion during time 2. In some configurations, the transcription 120 output from the ASR system 118 is processed, e.g., by a natural language understanding (NLU) or natural language processing (NLP) module executing on the user device 10 or the remote computing system 60, to execute a user command/query specified by the utterance 106. Additionally or alternatively, a text-to-speech system (not shown) (e.g., executing on any combination of the user device 10 or the remote computing system 60) may convert the transcription 120 into synthesized speech for audible output by the user device 10 and/or another device.

In the example shown, the user 104 interacts with a digital assistant application 50 or other program of the user device 10 that uses the ASR system 118. For instance, FIG. 1 depicts the user 104 communicating with the digital assistant application 50 and the digital assistant application 50 displaying a digital assistant interface 17 on a screen 18 of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16*a* and processed by audio subsystem 108 of the user device 10. In this example, the audio subsystem 108 receives the spoken utterance 106 and converts it into a sequence of acoustic frames 110 for input to the ASR system 118.

Continuing with the example, the ASR model 200, while receiving the sequence of acoustic frames 110 corresponding to the utterance 106 as the user 104 speaks, encodes the sequence of acoustic frames 110 and then decodes the encoded sequence of acoustic frames 110 into the initial speech recognition results 120*a*. During time 1, the user interface generator 107 presents, via the digital assistant interface 17, a representation of the initial speech recognition results 120*a* of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 17, a representation of the final speech recognition results 120*b* of the utterance 106 to the user 104 of the user device 10 in a streaming fashion such that words, word pieces, and/or individual characters appear on the screen as soon as they are generated by the ASR model 200. In some implementations, the user interface generator 107 replaces the representation of the initial speech recognition results 120*a* presented at time 1 with the representation of the final speech recognition results 120*b* presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition results 120*a* at an earlier time than the final speech recognition results 120*b*. For instance, as the final speech recognition result 120*b* is presumed to be more accurate than the initial speech recognition result 120*a*, the final speech recognition result 120*b* ultimately displayed as the transcription 120 may fix any terms that may have been misrecognized in the initial speech recognition results 120*a*. In this example, the streaming initial speech recognition results 120*a* output by the ASR model 200 are displayed on the screen of the user device 10 at time 1 are associated with low latency and provide responsiveness to the user 104 that his/her query is being processed, while the final speech recognition result 120*b* output by the ASR model 200 and displayed on the screen at time 2 leverages an additional speech recognition model and/or a language model to improve the speech recognition quality in terms of accuracy, but at increased latency. However, since the initial speech recognition results 120*a* are displayed as the user speaks the utterance 106, the higher latency associated with producing, and ultimately displaying the final speech recognition results 120*b* is not noticeable to the user 104.

The final speech recognition result 120*b* is presumed to be more accurate than the initial speech recognition result 120*a* because the ASR model 200 determines the initial speech recognition results 120*a* in a streaming fashion and the final speech recognition results 120*b* using the prior non-blank symbols from the initial speech recognition result 120*a*. That is, the final speech recognition results 120*b* take into account the prior non-blank symbols and, thus, are presumed more accurate because the initial speech recognition results 120*a* do not take into account any prior non-blank symbols. Moreover, a rescorer (not shown for clarity of illustration) may update the initial speech recognition result 120*a* with the final speech recognition result 120*b* to provide the transcription via the user interface generator 107 to the user 104.

In the example shown in FIG. 1, the digital assistant application 50 may respond to the question posed by the user 104 using NLP or NLU. NLP/NLU generally refer to a process of interpreting written language (e.g., the initial speech recognition result 120*a* and/or the final speech recognition result 120*b*) and determining whether the written language prompts any action. In this example, the digital assistant application 50 uses NLP/NLU to recognize that the question 106 from the user 104 regards the user's schedule and more particularly a concert on the user's schedule. By recognizing these details with NLP/NLU, the automated assistant returns a response 19 to the user's query where the response 19 states, "Venue doors open at 6:30 PM and concert starts at 8 pm." In some configurations, NLP/NLU occurs on the remote computing system 60 in communication with the data processing hardware 12 of the user device 10.

Figure 2:
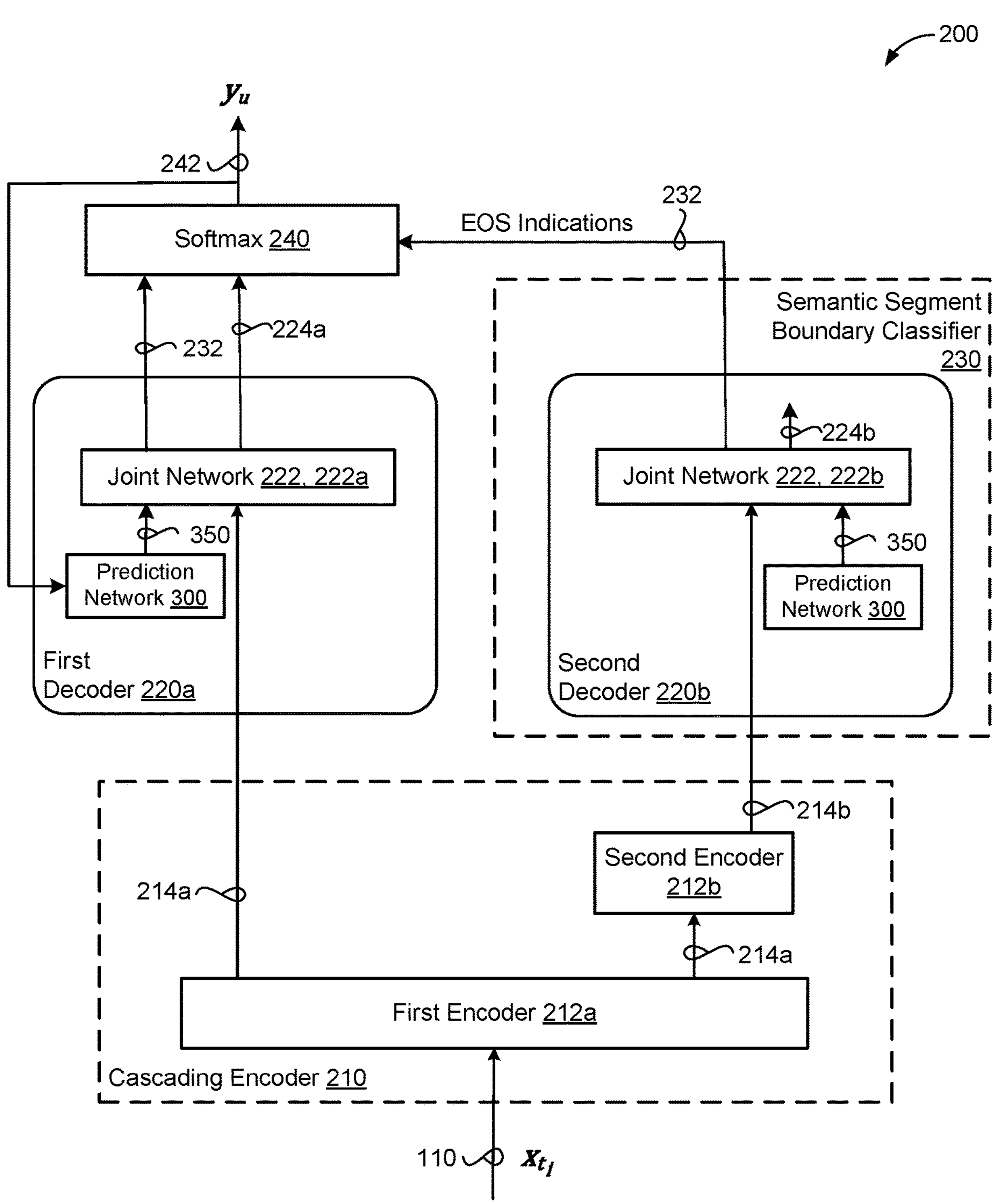
FIG. 2 is a schematic view of an example speech recognition model.

FIG. 2 depicts an example ASR model 200 that includes a Recurrent Neural Network-Transducer (RNN-T) model architecture. The use of the RNN-T model architecture is exemplary only, and the ASR model 200 may include other architectures such as transformer-transducer and conformer-transducer model architectures, among others. The RNN-T model architecture provides a small computational footprint and utilizes less memory requirements than conventional ASR architectures, making the RNN-T model architecture suitable for performing speech recognition entirely on the user device 10 (e.g., no communication with a remote computing system or server is required).

As shown, the ASR model 200 includes a shared encoder network 210, a first decoder 220*a*, a semantic segment boundary classifier 230 that includes a second decoder 220*b*, and a final Softmax layer 240. Here, the encoder network 210 and the first decoder 220*a* form a first RNN-T model, and the encoder network 210 and the second decoder 220*b* form a second RNN-T model. The first decoder 220*a* generates, at each of a plurality of output steps, a probability distribution 224*a* over possible speech recognition hypotheses. The second decoder 220*b* generates, at each of the plurality of output steps, an EOS indication 232 of whether the corresponding output step corresponds to an EOS. In some examples, the decoders 220 together form a decoder that generates, at each of a plurality of output steps, a probability distribution over possible speech recognition hypotheses, and an indication of whether the corresponding output step corresponds to an EOS.

In the illustrated example, the encoder network 210 includes a cascading encoder network that includes two encoders 212*a*, 212*b* that cascade such that the output 214*a* of the first encoder 212*a* feeds the input of the second encoder 212*b* prior to decoding. However, other encoder networks 210 may be used. Here, the first encoder 212*a* and the second encoder 212*b* may be cascaded irrespective of the underlying architecture of each encoder. The encoders 212 may each include a stack of multi-head self-attention layers.

In some examples, the first encoder 212*a* includes a causal encoder having one of a plurality of unidirectional (LSTM) layers, a plurality of conformer layers, a plurality of transformer layers. For example, the first encoder 212*a* may include nine (9) conformer layers each having a multi-headed (e.g., eight (8) heads) self-attention mechanism and a convolutional kernel size of fifteen (15). Moreover, the first encoder 212*a* may perform a concatenation operation after a third conformer layer to achieve a time reduction rate of two whereby the resulting 1024-dimensional vectors are transformed by a fourth conformer layer and then projected back to a 512-dimensional vector using another linear transformation. Thereafter, another eight (5) conformer layers are followed by a final normalization layer. Thus, the first encoder 212*a* may include 57 million parameters. Each layer of the first encoder 212*a* receives zero right-context (e.g., receives zero future acoustic frames). The first encoder 212*a* may include a plurality of multi-head attention layers other than conformer or transformer layers in other examples.

In some examples, the second encoder 212*b* includes a non-causal encoder having one of one or more bi-directional LSTM layers, a plurality of conformer layers, or a plurality of transformer layers. For instance, the second encoder 212*b* may include six (6) conformer layers of 640-dimensions and a final linear normalization layer thereby resulting in 117 million parameters. The second encoder 212*b* may receive additional right-context, for example a total of 15-right context frames across all layers to provide 900 milliseconds of additional right context. The second encoder 212*b* may include a plurality of multi-head attention layers other than conformer or transformer layers in other examples.

The first encoder 212*a* receives a sequence of d-dimensional feature vectors (e.g., sequence of acoustic frames 110) $x=(x_1, x_2, \ldots, x_T)$, where $x_t \in \mathbb{R}^d$. Here, each sequence of acoustic frames 110 characterizes a spoken utterance 106. The first encoder 212*a* generates, at each output step of a plurality of output steps, a first higher order feature representation 214*a* for a corresponding acoustic frame 110 in the sequence of acoustic frames 110. Similarly, the second encoder 212*b* is connected in cascade to the first encoder 212*a* and receives, as input, the first higher order feature representation 214*a* and generates, at each output step, a second higher order feature representation 214*b* for a corresponding first higher order feature representation 214*a*. In some instances, the second encoder 212*b* generates a second higher order feature representation 214*b* from the first higher order feature representation 214*a* without receiving any of the acoustic frames 110 as input. In these instances, the second encoder 212*b* generates the second higher order feature representations 214*b* using only the first higher order feature representation 214*a* as input. That is, the first higher order feature representations 214*a* received from the first encoder 212*a* serves as additional right-context. The first encoder 212*a* outputs the first higher order feature representations 214*a* to the second encoder 212*b* and the first decoder 220*a* while the second encoder 212*b* outputs the second higher order feature representations 214*b* to the second decoder 220*b*.

In the illustrated example, the first decoder 220*a* includes a prediction network 300 and a joint network 222*a*, and the second decoder 220*b* includes the prediction network 300 and a joint network 222*b*. While the first and second decoders 220*a*, 220*b* share a common prediction network 300, the first decoder 220*a* and the second decoder 220*b* may each include a separate respective prediction network 300. In some implementations, the decoders 220 are trained separately. The decoder 220*a* can be trained using, for example, any suitable RNN-T training process for training an ASR model. An example process for training the semantic segment boundary classier 230 is described below in connection with FIG. 4.

The prediction network 300 may include a LSTM network and, like a language model (LM), receive, as input, a respective sequence of non-blank symbols 242 output by a final Softmax layer 240 and generate, at each output step, a dense representation 350. In the example shown, the joint network 222*a* is not conditioned on the outputs 224*b* of the other joint network 222*b*, and the joint network 222*b* is not conditioned the outputs 224*a* of the other joint network 222*a*. As described in greater detail below, the representations 350 may include a single embedding vector. Notably, the sequence of non-blank symbols 242 received at a prediction network 300 captures linguistic dependencies between non-blank symbols 242 predicted during the previous output steps so far to assist a corresponding joint network 222 in predicting the probability of a next output symbol or blank symbol during the current output step. As described in greater detail below, to contribute to techniques for reducing the size of the prediction network 300 without sacrificing accuracy/performance of the ASR model 200, a prediction network 300 may receive a limited-history sequence of non-blank symbols 242 $y_{ui-n}, \ldots, y_{ui-1}$ that is limited to the N previous non-blank symbols 242 output by the final Softmax layer 240.

Each joint network 222 combines a respective higher-order feature representation 214 produced by the encoder network 210 and the representation 350 (i.e., single embedding vector 350) produced by the prediction network 300. Each joint network 222 predicts a distribution $Z_i=P(y_i|x_{t_i}, y_0, \ldots, y_{u_{i-1}})$ 224 over the next output symbol. Stated differently, each joint network 222 generates, at each output step, a respective probability distribution 224 over possible speech recognition hypotheses. Here, the "possible speech recognition hypotheses" correspond to a set of output labels each representing a symbol/character in a specified natural language. The joint network 222 also generates, at each output step, a respective EOS indication 232 of whether the corresponding output step corresponds to an EOS. For example, when the natural language is English, the set of output labels may include twenty-seven (27) symbols, e.g., one label for each of the 26-letters in the English alphabet and one label designating a space. Accordingly, the joint networks 220 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution 224 of a joint network 222 can include a posterior probability value for each of the different output labels. Thus, if there are 100 different output labels representing different graphemes or other symbols, the output 224 of a joint network 222 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The semantic segment boundary classifier 230 receives the second higher order feature representation 214*b* generated by the second encoder 212*b* at each of a plurality of output steps, and generates, at each output step, an EOS indication 232 of whether the current output step corresponds to an EOS. In some implementations, the semantic segment boundary classifier 230 outputs an EOS indication 232 when the posterior probability associated with predicting an EOS satisfies (e.g., falls below) a preset or predetermined threshold. In some examples, the semantic segment boundary classifier 230 is trained to directly predict EOS tokens. Additionally or alternatively, the semantic segment boundary classifier 230 may be trained to predict punctuation for a predicted transcription, and then to predict end of segments based on the predicted punctuation. Notably, the semantic segment boundary classifier 230 is trained to make both semantic segment boundary predictions and to predict a distribution 224*b* over possible speech recognition hypotheses for a next output symbol.

The final Softmax layer 240 receives the probability distribution 224*a* for the final speech recognition result 120*b* and selects the output label/symbol with the highest probability to produce the transcription 120. For long-form speech, when an EOS indication 232 corresponding to a predicted semantic segment boundary is output by the semantic segment boundary classifier 230, the Softmax layer 240 selects the output label/symbol with the highest probability to produce the transcription 120. In some implementations, the states of the encoder network 210 and the decoders 220 are then reset, the beam search is then reset, and all hypotheses are discarded. Alternatively, the state of the encoder network 210 and the state of the decoder 220 for the top hypothesis 224*a* selected by the Softmax layer 240 are retained. The final Softmax layer 240 may employ any technique to select the output label/symbol with the highest probability in the distribution 224*a*. In this manner, the first decoder 220*a* does not make a conditional independence assumption, rather the prediction of each symbol $y_u$ 242 is conditioned not only on the acoustics but also on the sequence of labels 242 $y_{u-n}, \ldots, y_{ui-1}$ output so far. The first decoder 220*a* does assume an output symbol 242 is independent of future acoustic frames 110, which allows the ASR model 200 to be employed in a streaming fashion.

Figure 3:
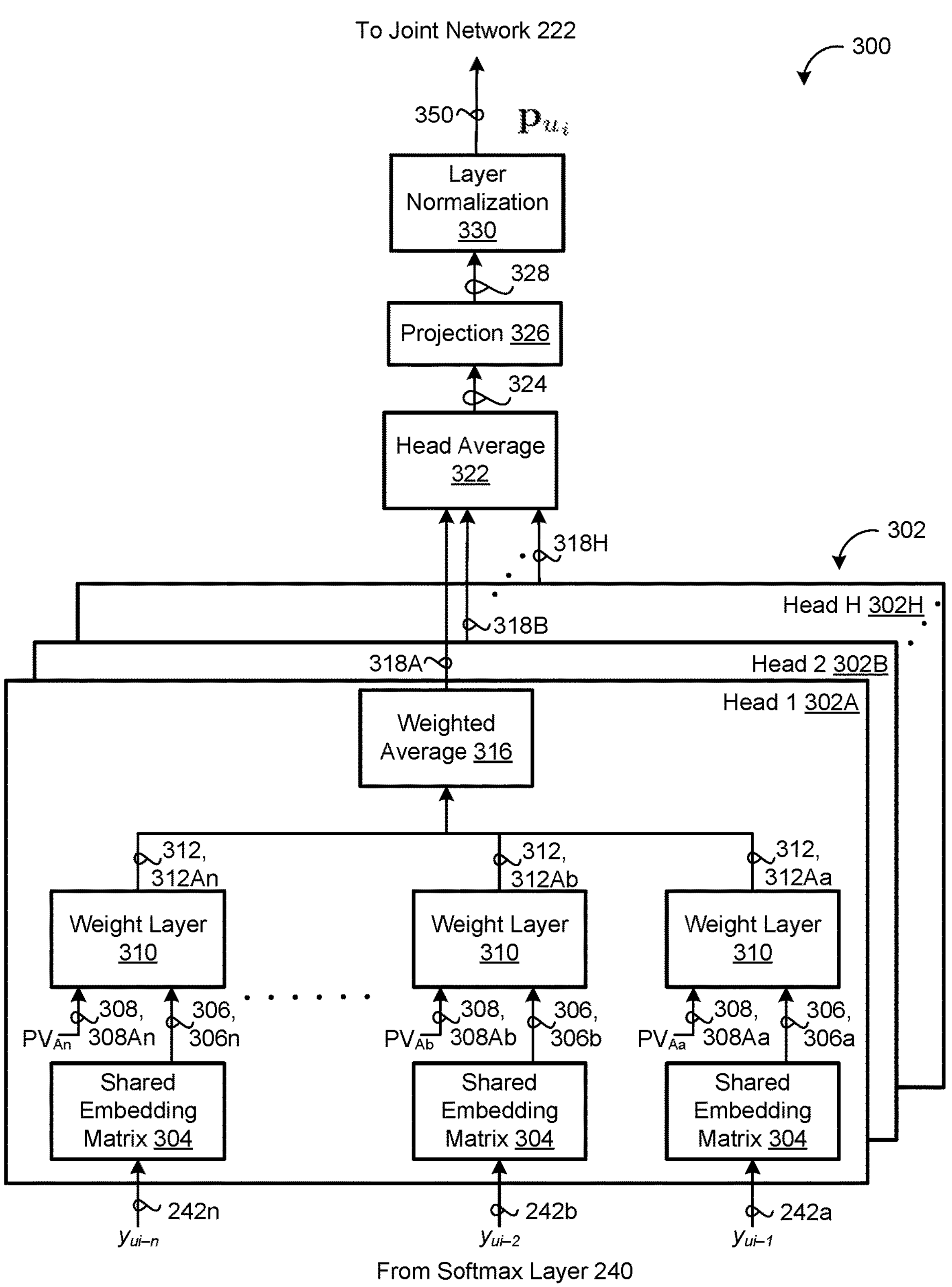
FIG. 3 is a schematic view of an example prediction network.

FIG. 3 is a schematic view of an example prediction network 300 for the ASR model 200. The prediction network 300 receives, as input, a sequence of non-blank symbols 242*a-n* $y_{ui-n}, \ldots, y_{ui-1}$ that is limited to the N previous non-blank symbols 242*a-n* output by the final Softmax layer 240. In some examples, N is equal to two. In other examples, N is equal to five, however, the disclosure is non-limiting and N may equal any integer. The sequence of non-blank symbols 242*a-n* indicates an initial speech recognition result 120*a* (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306*a-n* (e.g., $X \in \mathbb{R}^{N \times d_e}$) for each non-blank symbol among the sequence of non-blank symbols 242*a-n* $y_{ui-n}, \ldots, y_{ui-1}$ received as input at the corresponding output step from the plurality of output steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols 242*a-n* $y_{ui-n}, \ldots, y_{ui-1}$. The respective position vector PV 308 assigned to each non-blank symbol indicates a position in the history of the sequence of non-blank symbols (e.g., the N previous non-blank symbols 242*a-n* output by the final Softmax layer 230). For instance, the first position vector $PV_{Aa}$ is assigned to a most recent position in the history, while the last position vector $PV_{An}$ is assigned to a last position in the history of the N previous non-blank symbols output by the final Softmax layer 240. Notably, each of the embeddings 306 may include a same dimensionality (i.e., dimension size) as each of the position vectors PV 308.

While the corresponding embedding generated by shared embedding matrix 304 for each for each non-blank symbol among the sequence of non-blank symbols 242*a-n* $y_{ui-n}, \ldots, y_{ui-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ $\mathbf{308}_{Ba-Bn}$, . . . , and the $H^{th}$ head 302 H defines another different row of position vectors $PV_{Ha-Hn}$ $\mathbf{308}_{Ha-Hn}$.

For each non-blank symbol in the sequence of non-blank symbols 242*a-n* received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H * N} \sum_{h,n} X_n * \sum_e (X_{n,e} * P_{h,n,e}) \tag{1}$$

In Equation (1), h represents the index of the heads 302, n represents position in context, and e represents the embedding dimension. Additionally, in Equation (1), H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $p_{u_i}$ 350 at the corresponding output step from the plurality of output steps. The prediction network 300 generates only a single embedding vector $p_{u_i}$ 350 at each of the plurality of output steps subsequent to an initial output step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $p_{u_i}$ 350.

In some implementations, to further reduce the size of the RNN-T decoder, i.e., the prediction network 300 and the joint network 222, parameter tying between the prediction network 300 and the joint network 222 is applied. Specifically, for a vocabulary size |V| and an embedding dimension $d_e$, the shared embedding matrix 304 at the prediction network is $E \in \mathbb{R}^{|V| \times d_e}$. Meanwhile, a last hidden layer includes a dimension size $d_h$ at the joint network 222, feed-forward projection weights from the hidden layer to the output logits will be $W \in \mathbb{R}^{d_h \times |V+1|}$, with an extra blank token in the vocabulary. Accordingly, the feed-forward layer corresponding to the last layer of the joint network 222 includes a weight matrix $[d_h, |V]|$. By having the prediction network 300 to tie the size of the embedding dimension $d_e$ to the dimensionality $d_h$ of the last hidden layer of the joint network 222, the feed-forward projection weights of the joint network 222 and the shared embedding matrix 304 of the prediction network 300 can share their weights for all non-blank symbols via a simple transpose transformation. Since the two matrices share all their values, the RNN-T decoder only needs to store the values once on memory, instead of storing two individual matrices. By setting the size of the embedding dimension $d_e$ equal to the size of the hidden layer dimension $d_h$, the RNN-T decoder reduces a number of parameters equal to the product of the embedding dimension $d_e$ and the vocabulary size |V|. This weight tying corresponds to a regularization technique.

Figure 4:
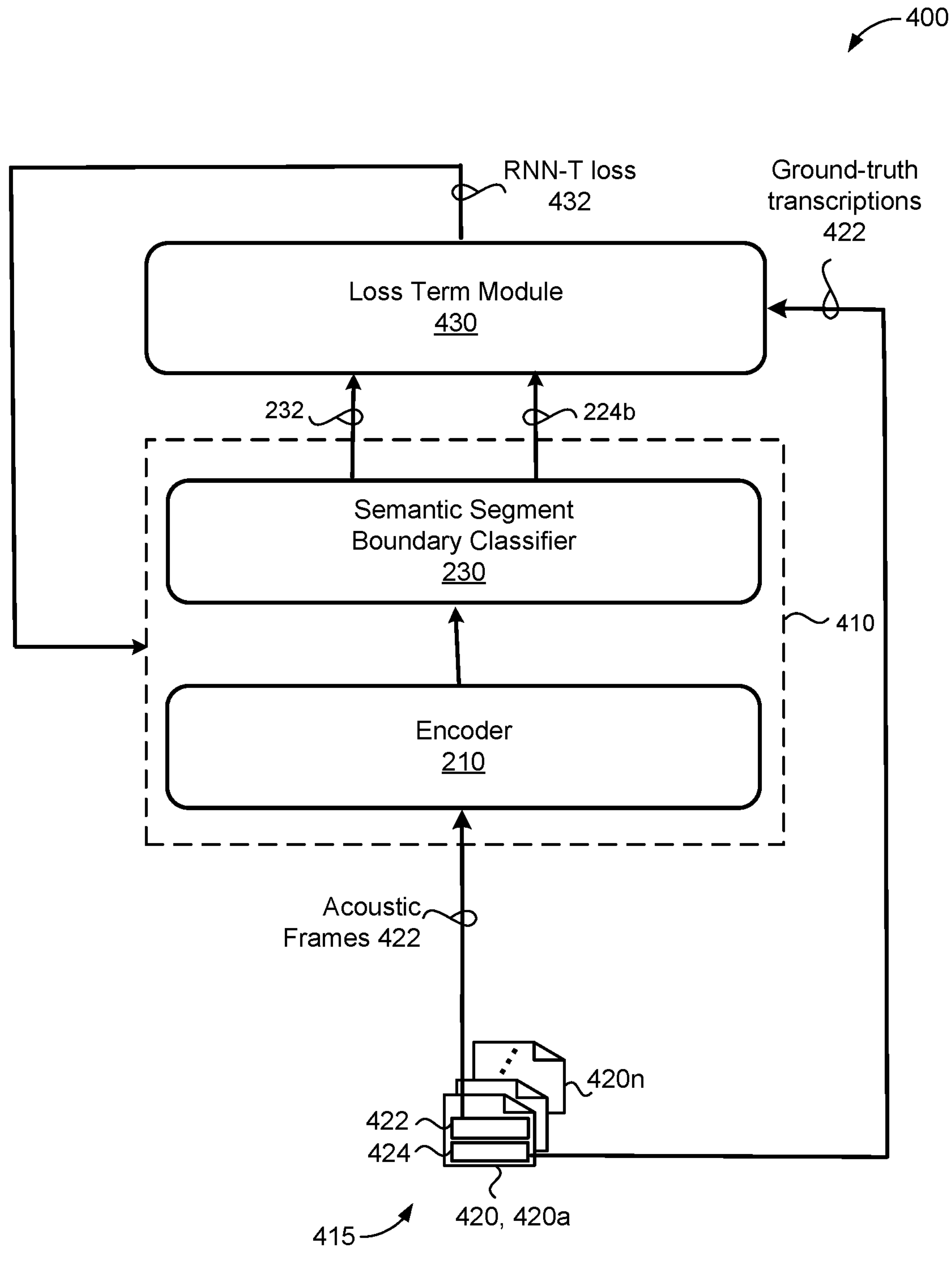
FIG. 4 is a schematic view of an example training process for training a speech recognition model to perform semantic segmentation.

FIG. 4 is a schematic view of an example training process 400 for training the semantic segment boundary classifier 230 to learn to predict the ends of segments for long-form training utterances. In this example, the semantic segment boundary classifier 230 is part of an RNN-T model 410 that includes the shared encoder network 210 and the semantic segment boundary classifier 230. Here, the semantic segment boundary classifier 230 includes the second decoder 220*b*, which includes the prediction network 300*b* and the joint network 222*b*. The training process 400 may execute on the remote computing system 60 (i.e., on the data processing hardware 62) or on the user device 10 (i.e., on the data processing hardware 12). In the example shown, the training process 400 trains the semantic segment boundary classifier 230 using a set of training samples 415. Here, each particular training sample 420 of the set of training samples 415 includes corresponding audio data 422 characterizing multiple segments of long-form speech, and a corresponding ground-truth transcription 424 of the long-form speech. In some examples, a ground-truth transcription 424 includes ground-truth EOS labels inserted by, for example, the automated two-stage training process of FIGS. 5A and 5B. However, the ground-truth EOS labels may be inserted using other methods, such as manually during manual transcription.

For each particular training sample 420 in the set of training samples 415, the training process 400 processes, using the RNN-T model 410, the corresponding audio data 422 to obtain a corresponding predicted speech recognition hypothesis 224*b* and corresponding predicted EOS labels 232. Thereafter, for each particular training sample 420, a loss term module 430 receives the corresponding speech recognition hypothesis 224*b* and the corresponding predicted EOS labels 232 output by the RNN-T model 410 for the particular training sample 420. The loss term module 430 then determines a loss 432 for the particular training sample 420 based on differences between the corresponding recognition hypothesis 224*b* and the corresponding predicted EOS labels 232 relative to the corresponding ground-truth transcription 424. In some implementations, the loss 432 is an RNN-T loss. Notably, each ground-truth transcription 424 includes ground-truth EOS labels obtained, for example, via distillation from a language model teacher 510 (see FIGS. 5A and 5B) that receives the corresponding transcription 424 as input and injects the ground-truth EOS labels into the corresponding transcription 424 between semantically complete segments.

Based on the loss 432 output by the loss term module 430 for each training sample 420, the training process 400 trains the semantic segment boundary classifier 230 to minimize the loss 432 or maximize a probability of emitting the ground-truth EOS labels. Notably, the semantic segment boundary classifier 230 is also trained to learn to predict wordpieces to regularize timing of the predicted EOS labels with the predicted wordpieces in the speech recognition hypothesis 224*b*. In some examples, the training process 400 trains the semantic segment boundary classifier 230 by adjusting, adapting, updating, fine-tuning, etc. one or more parameters of the second decoder 220*b*, while parameters of the first decoder 220*a* and the shared encoder network 210 are held fixed or frozen. In some implementations, the training process 400 sets the initial parameters of the second decoder 220*b* to be equal to previously trained parameters of the first decoder 220*a*. That is, the training process 400 may train the ASR model 200 by initially training the first joint network 222*a* to learn how to predict transcriptions of spoken utterances, and then initializing the parameters of the second joint network 222*b* to be equal to the parameters of the trained first joint network 222*a*. In some examples, the training process 400 trains the semantic segment boundary classifier 230 using all or some of the training samples 420 originally used to train the encoder network 210 and the first decoder 220*a* after ground-truth EOS labels are added to the ground-truth transcriptions 424 for the training samples 420 (see FIGS. 5A and 5B).

Figure 5A:
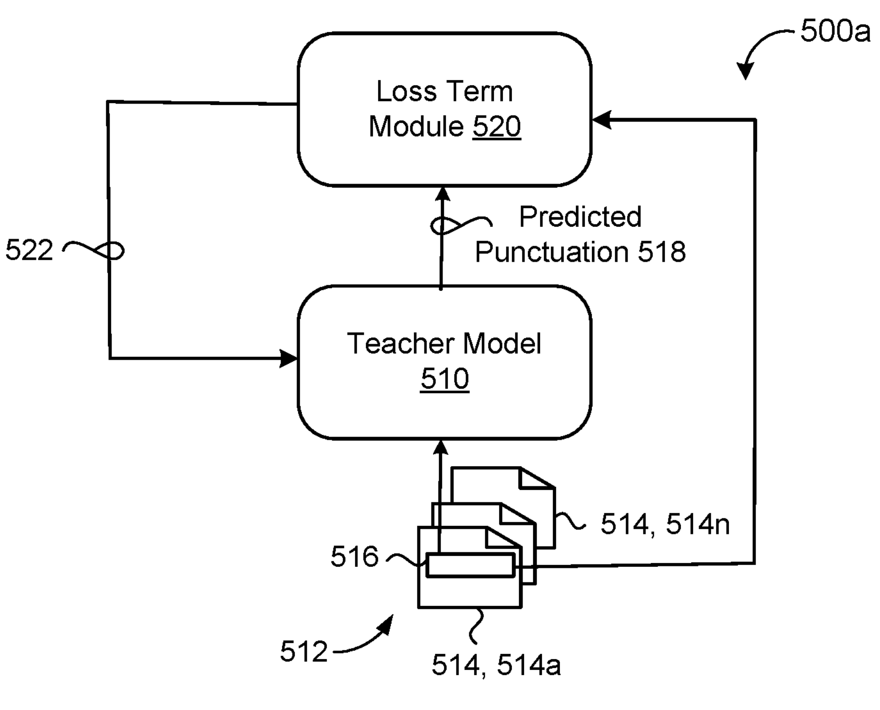
FIGS. 5A and 5B are schematic views of an example two-stage training process for generating a set of training samples for training a speech recognition model to perform semantic segmentation.
Figure 5B:
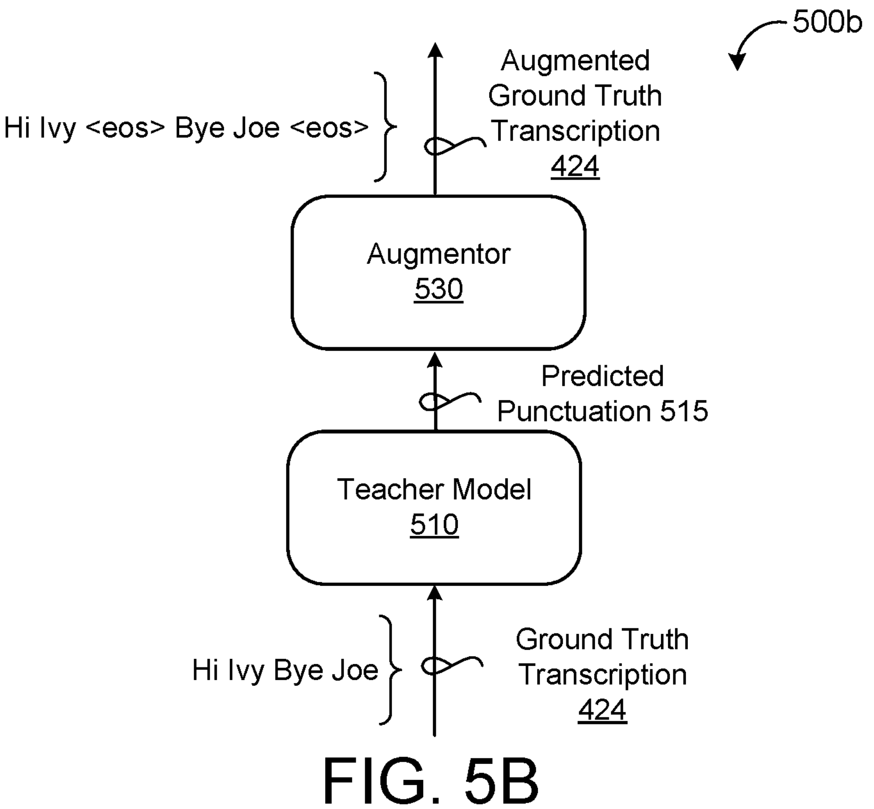

FIGS. 5A and 5B depict an example two-stage training process 500 for augmenting ground-truth training transcriptions with ground-truth EOS labels. Notably, the two-stage training 500 automatically inserts ground-truth EOS labels in ground-truth training transcriptions without any human annotation. In a first-stage training process 500_a_ shown in FIG. 5A, a teacher model 510 is trained on a corpus of written-domain training samples 512 containing punctuation to teach the teacher model 510 to learn to predict the punctuation in the written text of the corpus of written-domain training samples 512. For each particular written-domain training sample 514 of the corpus of written-domain training samples 512, the training process 500_a_ processes, using the teacher model 510, text 516 without punctuation of the particular written-domain training sample 514 to generate corresponding predicted punctuation 518 for the particular written-domain training sample 514. A loss term module 520 thereafter receives the text 516 with punctuation of the particular written-domain training sample 514 and the corresponding predicted punctuation 518, and determines a loss 522 based on punctuation differences there between. The training process 500_a_ then trains the teacher model 510 (e.g., by adjusting, adapting, updating, etc. one or more parameters of the teacher model 510) to minimize the loss 522. In some examples, the teacher model 510 is a language model. Additionally or alternatively, the teacher model 510 includes a bi-directional recurrent neural network architecture.

In a second-stage training process 500_b_ shown in FIG. 5B, the teacher model 510 is used to augment the ground-truth transcriptions 424 of the set of training samples 415 to include ground-truth EOS labels. For each particular ground-truth transcription 424 of the set of training samples 415 (e.g., "Hi Ivy Bye Joe"), the training process 500_b_ processes, using the teacher model 510, the particular ground-truth transcription 424 to generate corresponding predicted punctuation 514 for the particular ground-truth transcription 424. Thereafter, an augmentor 530 augments the particular ground-truth transcription 424 by inserting ground-truth EOS labels, for example, <eos> labels into the ground-truth transcription 424. In the example of FIG. 5B, the augmentor 530 inserts an <eos> label after both Ivy and Joe, which results in an augmented ground-truth transcription 424 of "Hi Ivy <eos> Bye Joe <eos>". In some implementations, the augmentor 530 inserts a ground-truth EOS label for each comma, period, question mark, and exclamation point predicted by the teacher model 510 for the ground-truth transcription 424.

Figure 6:
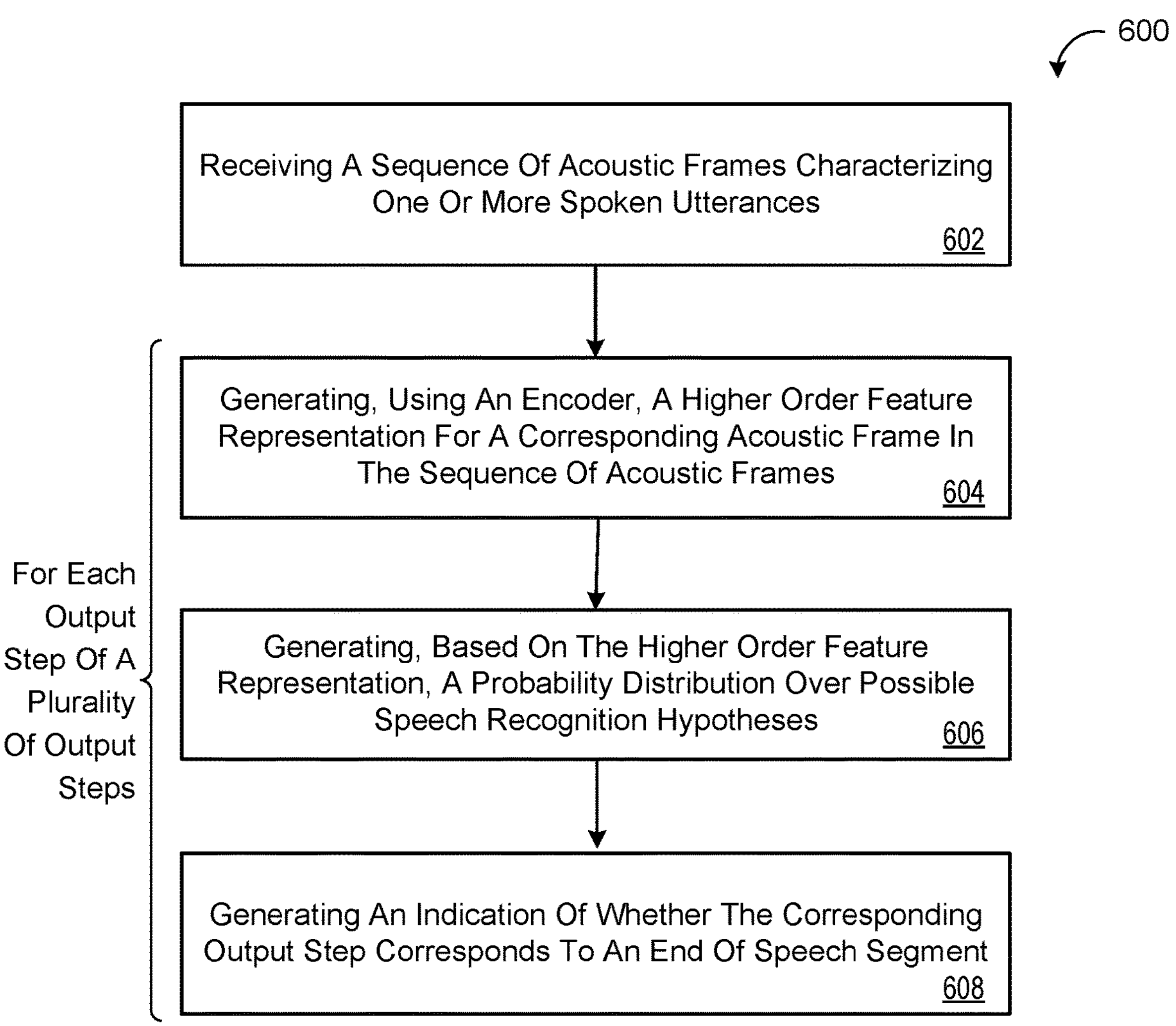
FIG. 6 is a flowchart of an example arrangement of operations for a computer-implemented method for performing semantic segmentation of long-form speech.

FIG. 6 is a flowchart of an exemplary arrangement of operations for a computer-implemented method 600 for training a joint segmenting and ASR model (e.g., the ASR model 200). The operations may be performed by data processing hardware 610 (e.g., the data processing hardware 12 of the user device 10 or the data processing hardware 62 of the remote computing system 60) based on executing instructions stored on memory hardware 620 (FIG. 6) (e.g., the memory hardware 14 of the user device 10 or the memory hardware 64 of the remote computing system 60).

At operation 602, the method 600 includes receiving a sequence of acoustic frames characterizing 110 one or more spoken utterances 106. The method 600 includes at operation 604 generating, at each of a plurality of output steps, a higher order feature representation 214 for a corresponding acoustic frame 110 in the sequence of acoustic frames 110. At operation 606, the method 600 includes generating, at each of the plurality of output steps, a probability distribution 224 over possible speech recognition hypotheses. The method 600 at operation 608 includes generating, at each of the plurality of output steps, an indication 232 of whether the corresponding output step corresponds to an EOS. Here, the joint segmenting and ASR model 200 is trained on a set of training samples 415, each training sample 420 in the set of training samples 415 including audio data 422 characterizing multiple segments of long-form speech; and a corresponding transcription 424 of the long-form speech, the corresponding transcription 424 annotated with EOS labels obtained via distillation from a language model teacher 510 that receives the corresponding transcription 424 as input and injects the EOS labels into the corresponding transcription 424 between semantically complete segments.

Figure 7:
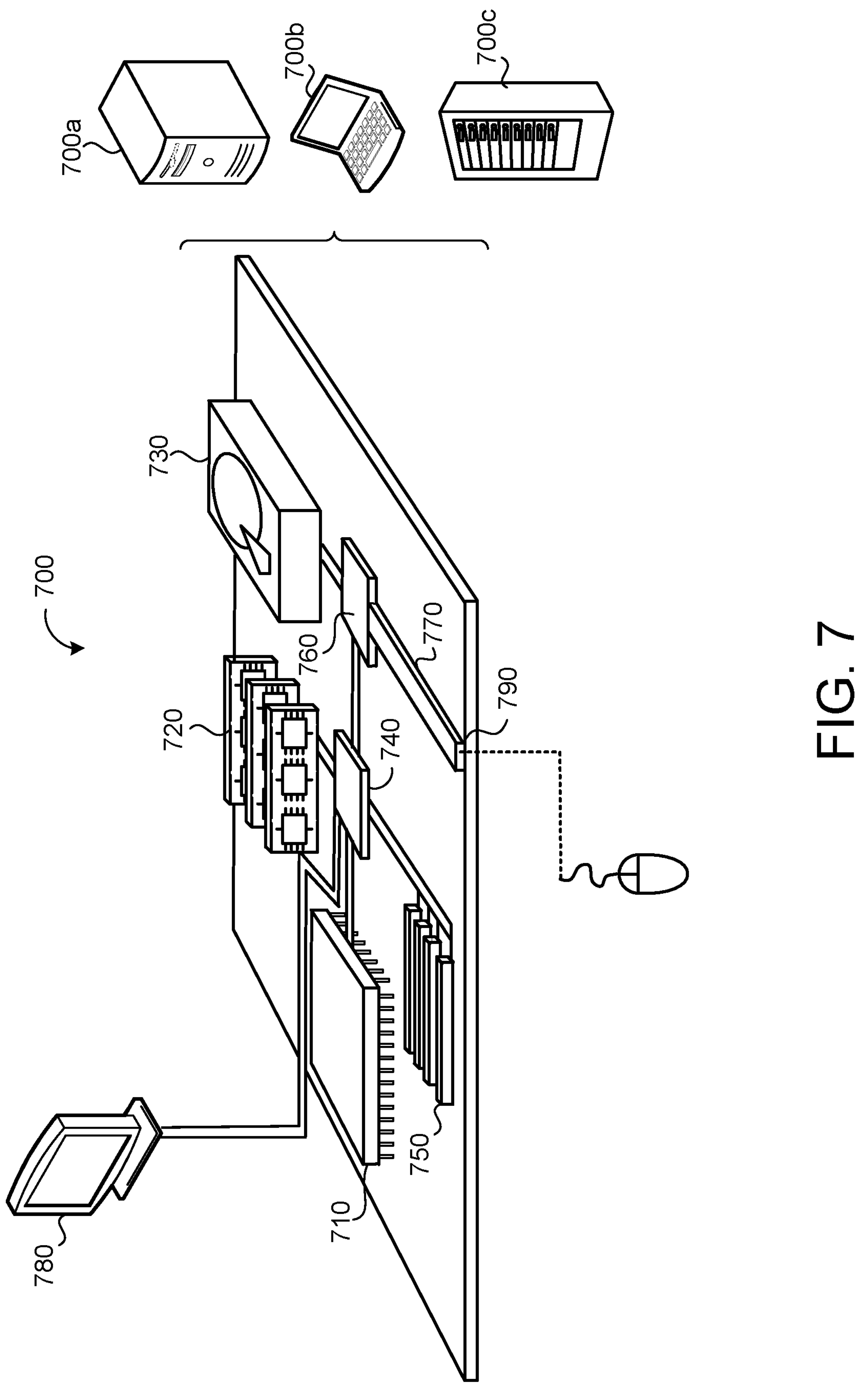
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710 (i.e., data processing hardware) that can be used to implement the data processing hardware 12 and/or 62, memory 720 (i.e., memory hardware) that can be used to implement the memory hardware 14 and/or 64, a storage device 730 (i.e., memory hardware) that can be used to implement the memory hardware 14 and/or 64, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, "or" refers to an inclusive or and not to an exclusive or. For example, "A, B, or C" refers to any combination or subset of A, B, C such as: (1) A alone; (2) B alone; (3) C alone; (4) A with B; (5) A with C; (6) B with C; and (7) A with B and with C. Similarly, the phrase "at least one of A or B" is intended to refer to any combination or subset of A and B such as: (1) at least one A; (2) at least one B; and (3) at least one A and at least one B. Moreover, the phrase "at least one of A and B" is intended to refer to any combination or subset of A and B such as: (1) at least one A; (2) at least one B; and (3) at least one A and at least one B.

A number of implementations have been described. Nevertheless, it will be understood that various modifications may be made without departing from the spirit and scope of the disclosure. Accordingly, other implementations are within the scope of the following claims.

What is claimed is:

1. A system comprising:

data processing hardware; and memory hardware in communication with the data processing hardware and storing instructions that when executed on the data processing hardware causes the data processing hardware to implement a joint segmenting and automated speech recognition (ASR) model comprising:

an encoder configured to:

receive, as input, a sequence of acoustic frames characterizing one or more spoken utterances; and generate, at each output step of a plurality of output steps, a higher order feature representation for a corresponding acoustic frame in the sequence of acoustic frames; and a decoder configured to:

receive, as input, the higher order feature representation generated by the encoder at each output step of the plurality of output steps; and generate, at each output step of the plurality of output steps:

a probability distribution over possible speech recognition hypotheses; and an indication of whether the output step corresponds to an end of segment, wherein the joint segmenting and ASR model is trained on a set of training samples, each training sample in the set of training samples comprising:

audio data characterizing multiple segments of long-form speech; and a corresponding transcription of the long-form speech, the corresponding transcription annotated with ground-truth end of segment labels obtained via distillation from a language model teacher that receives the corresponding transcription as input and injects the ground-truth end of segment labels into the corresponding transcription between semantically complete segments, wherein:

the language model teacher is trained on a corpus of written text containing punctuation to teach the language model teacher to learn how to semantically predict ground-truth end of segment labels based on positions of punctuation in the written text;

the language model teacher processes the corresponding transcription to generate predicted punctuation; and an augmentor inserts a ground-truth end of segment label into the corresponding transcription for each comma, period, question mark, and exclamation point predicted by the language model teacher.

2. The system of claim 1, wherein the language model teacher comprises a bi-directional recurrent neural network architecture.

3. The system of claim 1, wherein the decoder comprises:

a prediction network configured to, at each output step of the plurality of output steps:

receive, as input, a sequence of non-blank symbols output by a final Softmax layer; and generate a hidden representation;

a first joint network configured to:

receive, as input, the hidden representation generated by the prediction network at each output step of the plurality of output steps and the higher order feature representation generated by the encoder at each output step of the plurality of output steps; and generate, at each output step of the plurality of output steps, the probability distribution over possible speech recognition hypotheses; and a second joint network configured to:

receive, as input, the hidden representation generated by the prediction network at each output step of the plurality of output steps and the higher order feature representation generated by the encoder at each output step of the plurality of output steps; and generate, at each of output step the plurality of output steps, the indication of whether the output step corresponds to an end of segment.

4. The system of claim 3, wherein, at each output step of the plurality of output steps:

the sequence of previous non-blank symbols received as input at the prediction network comprises a sequence of N previous non-blank symbols output by the final Softmax layer; and the prediction network is configured to generate the hidden representation by:

for each non-blank symbol of the sequence of N previous non-blank symbols, generating a respective embedding; and generating an average embedding by averaging the respective embeddings, the average embedding comprising the hidden representation.

5. The system of claim 3, wherein the prediction network comprises an embedding look-up table.

6. The system of claim 3, wherein a training process trains the joint segmenting and ASR model on the set of training samples by:

initially training the first joint network to learn how to predict the corresponding transcription of the spoken utterance characterized by the audio data of each training sample; and after training the first joint network, initializing the second joint network with the same parameters as the trained first joint network and using the ground-truth end of segment label inserted into the corresponding transcription of the spoken utterance characterized by the audio data of each training sample.

7. The system of claim 1, wherein the encoder comprises a causal encoder comprising a stack of conformer layers or transformer layers.

8. The system of claim 1, wherein the ground-truth end of segment labels are inserted into the corresponding transcription automatically without any human annotation.

9. The system of claim 1, wherein the joint segmenting and ASR model is trained to maximize a probability of emitting the ground-truth end of segment label.

10. A computer-implemented method executed on data processing hardware that causes the data processing hardware to implement a joint segmenting and automated speech recognition (ASR) model, the joint segmenting and ASR model comprising:

an encoder configured to:

receive, as input, a sequence of acoustic frames characterizing one or more spoken utterances; and generate, at each output step of a plurality of output steps, a higher order feature representation for a corresponding acoustic frame in the sequence of acoustic frames; and a decoder configured to:

receive, as input, the higher order feature representation generated by the encoder at each output step of the plurality of output steps; and generate, at each output step of the plurality of output steps:

a probability distribution over possible speech recognition hypotheses; and an indication of whether the output step corresponds to an end of segment, wherein the joint segmenting and ASR model is trained on a set of training samples, each training sample in the set of training samples comprising:

audio data characterizing multiple segments of long-form speech; and a corresponding transcription of the long-form speech, the corresponding transcription annotated with ground-truth end of segment labels obtained via distillation from a language model teacher that receives the corresponding transcription as input and injects the ground-truth end of segment labels into the corresponding transcription between semantically complete segments, wherein the language model teacher is trained on a corpus of written text containing punctuation to teach the language model teacher to learn how to semantically predict ground-truth end of segment labels based on positions of punctuation in the written text, wherein the language model teacher processes the corresponding transcription to generate predicted punctuation, and wherein an augmentor inserts a ground-truth end of segment label into the corresponding transcription for each comma, period, question mark, and exclamation point predicted by the language model teacher.

11. The computer-implemented method of claim 10, wherein the language model teacher comprises a bi-directional recurrent neural network architecture.

12. The computer-implemented method of claim 10, wherein the decoder comprises:

a prediction network configured to, at each output step of the plurality of output steps:

receive, as input, a sequence of non-blank symbols output by a final Softmax layer; and generate a hidden representation;

a first joint network configured to:

receive, as input, the hidden representation generated by the prediction network at each output step of the plurality of output steps and the higher order feature representation generated by the encoder at each output step of the plurality of output steps; and generate, at each output step of the plurality of output steps, the probability distribution over possible speech recognition hypotheses; and a second joint network configured to:

receive, as input, the hidden representation generated by the prediction network at each output step of the plurality of output steps and the higher order feature representation generated by the encoder at each output step of the plurality of output steps; and generate, at each output step of the plurality of output steps, the indication of whether the output step corresponds to an end of segment.

13. The computer-implemented method of claim 12, wherein, at each output step of the plurality of output steps:

the sequence of previous non-blank symbols received as input at the prediction network comprises a sequence of N previous non-blank symbols output by the final Softmax layer; and the prediction network is configured to generate the hidden representation by:

for each non-blank symbol of the sequence of N previous non-blank symbols, generating a respective embedding; and generating an average embedding by averaging the respective embeddings, the average embedding comprising the hidden representation.

14. The computer-implemented method of claim 12, wherein the prediction network comprises an embedding look-up table.

15. The computer-implemented method of claim 12, wherein a training process trains the joint segmenting and ASR model on the set of training samples by:

initially training the first joint network to learn how to predict the corresponding transcription of the spoken utterance characterized by the audio data of each training sample; and after training the first joint network, initializing the second joint network with the same parameters as the trained first joint network and using the ground-truth end of segment labels inserted into the corresponding transcription of the spoken utterance characterized by the audio data of each training sample.

16. The computer-implemented method of claim 10, wherein the encoder comprises a causal encoder comprising a stack of conformer layers or transformer layers.

17. The computer-implemented method of claim 10, wherein the ground-truth end of segment labels are inserted into the corresponding transcription automatically without any human annotation.

18. The computer-implemented method of claim 10, wherein the joint segmenting and ASR model is trained to maximize a probability of emitting the ground-truth end of segment labels.

* * * * *